106. COMPOSITIONS, COATING OR PLASTIC.

Patented Oct. 1, 1940

2,216,555

UNITED STATES PATENT OFFICE 2,216,555

SET-STABILIZED CALCINED GYPSUM PLASTER

George D. King, Chicago, and Manvel C. Dailey, Maywood, Ill., assignors to United States Gypsum Company, Chicago, Ill., a corporation of Illinois No Drawing. Application November 26, 1937, Serial No. 176,626

7 Claims. (Cl. 106—34)

*Aluminum Sulphate*
*Calcium Hydroxide*

The present invention relates to an improved set-stabilized calcined gypsum plaster in which the main improvement effected is the definite control of the residual alkalinity of the material, whereby many undesired effects are eliminated.

One of the objects of the invention is to produce a set-stabilized calcined gypsum plaster of the general type disclosed in a patent to George D. King, No. 1,989,641, but in which the alkaline ingredient, such as the lime, is so proportioned that there will be a definite, predetermined residual alkalinity in the material which, for practical purposes, does not exceed .07% when calculated as $Ca(OH)_2$. It has been found that if there is a substantially greater residual alkalinity in such a set-stabilized plaster, then, under conditions of rapid drying in use, such a plaster will have a decided tendency to cause what is known as "surface dry-outs," which are very undesirable, as they produce a soft, unset plaster surface which is powdery and nonuniform.

In the aforesaid patent to George D. King, No. 1,989,641, there is disclosed a means of stabilizing the setting time of calcined gypsum plaster against disturbance by adventitious admixture of accelerating or retarding influences, the desired result being achieved by combining a minor proportion of certain acid-reacting soluble sulfates, lime, and a retarder, these materials being incorporated with a major proportion of calcined gypsum—that is to say, calcium sulfate hemihydrate ($CaSO_4.\frac{1}{2}H_2O$).

In the commercial practice of the invention disclosed in the said King patent, it is desirable so to proportion the amounts of the added acid salts and the lime, or the adjustment of the said acid salts to the lime and lime-containing retarder, that the complete plaster mix will react alkaline and possess a predetermined pH value, of above 7, when mixed with water. A finished plaster which has an acid reaction after mixing with water would be undesirable from several practical standpoints. First of all, much of the gypsum that is used in the manufacture of plasters contains as an impurity a small amount of naturally occurring carbonates such as magnesium carbonate or calcium carbonate. Any free acid or acid reacting salts present in the plaster made up from gypsum containing such impurities will react with these carbonates, with the resultant evolution of carbon dioxide gas, which would tend to fluff up the mass of plastic gauged plaster, causing difficulty in the application of the plaster to the wall, lowering its strength, and interfering with its proper functions. An acid-reacting plaster would also have a decided tendency to corrode metal lath, metal reinforcing strips, or metal fixtures which are embedded in or in contact with the plaster.

We have now discovered that the setting action of a set-stabilized plaster, containing a major proportion of calcined gypsum and a minor proportion of a set-stabilizing composition comprising a soluble acid-reacting sulfate and lime together with retarder, is influenced to a great extent by the proportion of excess lime or alkaline reacting material which is present in the plaster. Therefore the present invention has for its principal object the proportioning of the major amounts of set-stabilizing ingredients in the set-stabilized plaster so as to improve the setting characteristics of the plaster, particularly as to surface setting and proper "browning out," a further object being to provide a set-stabilized plaster which when mixed with water, or with sand and water, does not stiffen or gel appreciably until shortly before the actual set occurs.

A further object is to add only enough lime to obtain the desired set stabilization, but not enough to destroy (as lime does) the desired "sticky" character of the cement plaster.

Other objects are to improve gypsum plaster in other respects hereinafter specified and claimed.

Plasters prepared in accordance with the disclosure contained in the patent to George D. King, No. 1,989,641, are very well set stabilized. For the purposes of the present invention as well as for an interpretation of the King patent, the following is our definition of what we mean by a "set-stabilized plaster," namely: a plaster compounded to contain both accelerative and retardive ingredients of such nature and in such amounts that the subsequent adventitious admixture, such as when mixed for use on the job, of accelerative or retardive influences will be without any material effect upon the setting time of the plaster. It has been observed, however, that the mechanism of the setting of such plasters varies quite decidedly as the relative amounts of aluminum sulfate or other soluble acid-reacting sulfate salts and added lime or lime-producing chemical are varied. With plasters containing a considerable excess of lime over the amount required completely to react with the added acid sulfate present, a thin soft skin of unset plaster remains upon the surface of the plaster sheet after the major portion of the plaster has set or hydrated. When such a plaster is applied to a building surface, as for example a wall or ceiling, that portion of the plaster next to the lath or other plaster-supporting means shows the first evidence of setting. Hardening then proceeds rapidly, extending progessively outwardly from the plaster-supporting means toward the exposed plaster surface. Under certain conditions of application, the main body of such a plaster may completely set while still leaving over the exposed surface a thin skin of unset plaster varying in thickness from an almost imperceptible skin to a layer as thick as $\frac{1}{16}$ inch, this skin not hydrating or setting for several hours after the main body of the plaster has already set.

Under rapid drying conditions, as for example in the application of thin coats of plaster during hot and dry weather or in locations where the plastered surfaces are exposed to wind or other rapid air circulation, it sometimes happens that the free water in the plaster evaporates before this thin surface skin has become hydrated and set, in which case a soft skin of unset plaster remains over the main portion of plaster, producing a condition which in the trade has come to be termed a "surface dry-out." Surface dry-outs of this type may be corrected in any of several manners. They may be prevented by screening the windows and door openings in rooms being plastered, thus reducing air circulation and rate of drying, thereby allowing sufficient time for the entire body of plaster to set or hydrate before the water required for complete hydration is lost from the surface of the plaster by evaporation. In cases where such surface dry-outs occur it is common practice to set up the thin surface skin by spraying the surface with water or an aqueous solution of set-accelerative salts, the added water being sufficient to react with the calcined gypsum in the unset surface layer. In cases where the dry-out surface is subsequently to be covered with another coat of plaster the extra water contained in the succeeding coat is generally sufficient to complete the hydration of the unset portion of the plaster in the first coat. While these devices successfully cure the condition, they are however time consuming and involve extra expense of operation. It is therefore very desirable to avoid them.

We have discovered that the formation of this soft, unset surface skin is aggravated by rapid drying conditions. In other words, plastered surfaces exposed to rapid drying conditions such as are occasioned by high temperatures, exposure to rapid air circulation, etc., require a longer time for complete hardening of the surface of the plaster than is the case where drying conditions are slower. This is true even when sufficient water remains in the plaster to effect complete hydration of the surface skin and even when additional water is added to the plaster to maintain the same in damp condition prior to setting. We believe that this phenomenon may be explained on the basis of the fact that under rapid drying conditions soluble or finely divided particles of retarder, which have been added for the purpose of retarding the set of the plaster, are carried to the surface of the plaster by the water which is evaporating therefrom, as a result of which the retarder becomes more concentrated in the outer layers of the plaster, hence further retarding the setting time of that portion of the plaster, and thereby permitting evaporation to take place before the water has had time to combine with the calcium sulfate hemihydrate to form the necessary dihydrate to effect the set. The decided effect of the rate of drying upon the formation of such soft surface skins with plasters of this type may be observed by placing a piece of glass over a panel plastered with such a plaster. If we take a plaster containing sufficient retarder to produce a setting time of approximately three hours and containing, let us say, 10 pounds per ton of aluminum sulfate and 20 pounds per ton of hydrated lime as the set-stabilizing ingredients, it will be noted that the portion of plaster underneath the glass has completely hardened or set at approximately the same time as the major portion of the plaster underneath the exposed surface (in about 3 hours). At the end of this time, however, the remainder of the panel, being exposed to rapid drying conditions, will remain covered with a thin unset surface of wet plaster, and this uncovered portion may require from 8 to 15 hours completely to harden or hydrate, depending upon drying conditions, temperature, etc. As no drying has occurred of that portion of the plaster covered by the glass plate, there will be no migration of retarder to the surface at that point, and hence the setting time of the surface portion of the plaster beneath the glass remains the same as that of the main body of the plaster.

Another practical disadvantage of set-stabilized plasters containing a considerable excess of lime or other alkalis is encountered in the commercial use of these plasters, which are normally mixed with sand and water in batches of sufficient size to supply enough plaster for one or two hours' application. It has been found that the presence of large excesses of lime causes such plasters to stiffen or thicken shortly after being gauged with water, the degree of such stiffening being sufficient to require the addition of further quantities of water and remixing after the plaster has lain in the mortar box for from one-half to one hour. This remixing operation requires additional labor and cost, and, furthermore, the remixed plaster is not as strong or dense as the originally mixed material because of its greater water content and lower density. This stiffening or gelling action is not to be confused with setting, which is something entirely different and usually occurs about three hours after mixing.

We have discovered that the time required for the completion of the hydration or set of the soft surface skin of such a plaster and the degree to which it will stiffen or gel prior to the set are both influenced very greatly by the amount of the excess lime or other alkaline-reacting material contained in the plaster. The greater the amount of lime or alkaline-reacting material present, the thicker will be the unset surface skin formed after the major portion of the plaster has set, and hence the longer will be the time required to set or hydrate this surface skin and also the greater will be the amount of preliminary stiffening prior to the set proper. The exact reason for this fact is not known. It may be that the lime itself is carried to the surface by migration with the water during the natural drying-out of the plaster, the combination of lime and retarder tending to congregate on the surface, thus acting together to give the surface a slower set than would be the case if the retarder alone had migrated. Another possible explanation is that the retarder is somewhat more soluble in a highly alkaline mixture than one which is less alkaline, in which case a greater proportion of retarder would be rendered soluble and hence migrate to the surface, where it would exert a correspondingly greater effect upon the setting of the plaster, thus slowing it down. In any event, the phenomenon occurs as described.

Preliminary stiffening may be due to "gelling" of the excess lime contained in the plaster. It is well known that hydrated lime, particularly dolomitic lime, exhibits this characteristic when gauged with water. By the practice of our invention we can successfully overcome this characteristic.

To demonstrate the rate of hydration of a plaster surface, we have prepared a number of plasters in which we used set-stabilizing ingredients but varied the amount of lime. For purposes of the test we prepared a fundamental mixture consisting of:

Calcined gypsum____ 99.275% (less the lime used)
Aluminum sulfate_____ 0.375%
Commercial retarder_____ 0.35 %

When lime was in part substituted for the calcined gypsum, the total of the calcined gypsum and lime equalled 99.275% of the mixture. A given amount of such a plaster was mixed with 2 parts by weight of regular plastering sand, the plaster mixed in a mortar box, and applied to a panel. Other mixtures were made, containing different amounts of lime, other conditions remaining the same, and a comparison was made of the behavior of the panels plastered therewith. The plasters were carefully observed to determine their setting time on the panels and also the time in which "browning out" or complete hydration of the surface started, as well as the time at which the surface was completely browned out or set. For the purposes of this comparative test, the time of set was taken as the elapsed time from the start of mixing of the plaster and the water up to the time at which the major portion of the plaster had set or hardened beneath the soft surface skin. The beginning of the browning out of the surface was shown by a change in color of the surface when hydration occurred, and also by the fact that set portions of the surface skin became hard and resistant to penetration while the unset portions remained soft. The time of complete brown-out was determined in a similar manner.

Five plasters were tested in this manner, the setting times of all of them being substantially the same, the plasters setting about two hours after the start of the mixing of the plaster, with a variation not greater than 15 minutes. It was found that as the percentage of lime present in the various plasters was increased, the time at which the hydration of the surface skin began was appreciably lengthened. Thus, for example, a plaster containing no added lime set in 2 hours, started to brown out on the surface in approximately 2 hours and 15 minutes, and was completely browned out in slightly over 4 hours. A plaster similar in all respects to the above, with the exception that it contained 0.265% of hydrated lime, set in approximately 2 hours and 5 minutes, surface hydration began in approximately 5 hours and 25 minutes, but complete browning out of the surface did not occur until 7 hours had elapsed after the mixing of the plaster and water. It appears that both the time of start and completion of the hydration of the soft surface skin are almost lineal functions of the amount of lime added to such plasters. It also appears that the residual alkalinity exerts a very marked influence upon these phenomena.

The retarder commonly used in gypsum cement plasters is added for the purpose of controlling the setting time of the plaster. This commercial retarder generally consists of a keratinous protein material which is partly hydrolyzed by digestion with sodium hydroxide, the finished retarder being extended by the addition of lime, which may be either dolomitic or high calcium lime, which is generally employed as such, or in the form of hydrated lime. As a result, commercial retarders of this type always contain a considerable proportion of lime, which may be varied between rather wide limits, dependent upon the amount and type of lime added and the degree of efficiency of the retarder. In the herein mentioned tests, a commercial retarder was employed which contained by analysis an alkalinity equivalent to a calcium hydroxide content of 80% as based upon the weight of the retarder. The lime added to the plaster was a dolomitic hydrated lime which, because of the presence therein of some magnesium oxide, had a total equivalent alkalinity of 128% when calculated as calcium hydroxide.

The following table shows the means employed for calculating the residual alkalinity of a gypsum plaster containing added retarder, aluminum sulfate and hydrated lime:

TABLE I

*Method of calculating residual alkalinity of gypsum plasters*

Per cent alkalinity of retarder as Ca(OH)$_2$_ 80.0
Percent alkalinity of lime as Ca(OH)$_2$_____ 128.0

*Basic formula*

Commercial calcined gypsum__ 99.275 (less lime)
Aluminum sulfate_____ 0.375
Retarder_____ 0.35
Lime (as indicated).

| Percent lime added | Percent total alkalinity as Ca(OH)$_2$ | | | Percent alkalinity as Ca(OH)$_2$ neutralized by added Al$_2$(SO$_4$)$_3$.18H$_2$O | Percent residual alkalinity of plaster as Ca(OH)$_2$ |
|---|---|---|---|---|---|
| | Retarder | Added lime | Total | | |
| 0.0 | 0.28 | 0.0 | 0.28 | 0.125 | 0.155 |
| 0.125 | 0.28 | 0.16 | 0.44 | 0.125 | 0.315 |
| 0.25 | 0.28 | 0.32 | 0.60 | 0.125 | 0.475 |
| 0.5 | 0.28 | 0.64 | 0.92 | 0.125 | 0.795 |
| 0.625 | 0.28 | 0.80 | 1.08 | 0.125 | 0.955 |

In the above Table I the percentages of alkalinity of added materials alkaline in nature, expressed as calcium hydroxide, are added to each other to obtain the total percentage of alkalinity. The equivalent amount of calcium hydroxide which is neutralized by the aluminum sulfate added (or other acid sulfates if they are used) is subtracted from the total alkalinity expressed in terms of calcium hydroxide obtained as indicated. The resulting difference represents the percentage of residual alkalinity of the plaster expressed in terms of calcium hydroxide. Any other alkaline material added to the plaster or any alkali present in the gypsum itself would also be included in calculating this percentage of what we term residual alkalinity. The residual alkalinity of any gypsum plaster may be experimentally determined in the laboratory with a fair degree of accuracy by the following analytical procedure: A weighed sample of the plaster is boiled in an Erlenmeyer flask with a given volume of standardized acid under a reflux condenser for a period of one-half hour, the flask then being cooled and the excess acid titrated back by means of a standard solution of an alkali such as sodium hydroxide or potassium hydroxide. Another sample of the same plaster is separately analyzed for its carbonate content by any standard procedure for the determination of carbonates or carbon dioxide, preferably employing for this purpose acid of the same strength as employed in determining the alkalinity, the acid being used to dissociate the carbonates present. From the results of this carbon dioxide determination it is possible to calculate the amount of acid required to decompose any of the naturally occurring insoluble carbonates present in the original plaster. The amount of acid thus calculated as being necessary for reaction with the carbonates is subtracted from the total acid which it has been found was necessary to neutralize both the alkaline and carbonate constituents of the plaster in the aforementioned alkalinity test, the difference being the amount of acid required to neutralize the alkaline constituents alone of the plaster. The figure thus obtained is calculated as percentage of alkali expressed in terms of calcium hydroxide, representing what we term the residual alkalinity of the plaster. This method of analysis will determine with a fair degree of accuracy the residual alkalinity of any plasters, with the possible exception of those containing appreciable amounts of soluble carbonates such as sodium carbonate, ammonium carbonate, etc. These ingredients however are rather rare and in ordinary set-stabilized plasters will scarcely be encountered.

We have discovered that in set-stabilized plasters which have been stabilized by the addition thereto of a soluble acid-reacting sulfate and an alkali such as lime, the rate of browning out of the soft surface skin and also the amount of stiffening which occurs prior to the set are functions of the residual alkalinity of the plaster as described above. The setting time of such plaster also affects the rate of browning out of the surface skin and, to a lesser extent, the stiffening of such plaster, but in general, for commercial use, the addition of retardive constituents to the plasters is so regulated that their setting times will be maintained within comparatively narrow limits, say, for example, between 2½ and 4 hours. We have found that to prevent trouble from surface dry-outs and excessive stiffening of a set-stabilized plaster made in accordance with the present disclosure, the residual alkalinity of such a plaster should be maintained at so low a point that it will not substantially exceed 0.7%, expressed in terms of calcium hydroxide. If on the contrary the residual alkalinity of such set-stabilized plasters is increased to above 0.7% and the plaster is used under severe or accelerated drying conditions, surface dry-outs of the plaster and the above mentioned stiffening will be excessive, while below this amount of residual alkalinity satisfactory set-stabilization, surface setting and mixing characteristics will result. It is however desirable that the plaster, in any case, have some residual alkalinity; that is to say, it should not be acid, and when we say, as in our claims, "a residual alkalinity not exceeding 0.7%," we intend it to be understood that the plaster has at least some residual alkalinity. For practical purposes we have found that a residual alkalinity of 0.5% gives the optimum results.

Further to demonstrate our invention, we give herein below various formulas of set-stabilized plasters, all of them having approximately the same time of set, but to which there have been added varying amounts of lime, alum and retarder to produce approximately the same time of set, the residual alkalinity of these plasters being given in the last column of the table.

TABLE II

| Formula No. | Per cent of added ingredients | | | Residual alkalinity as Ca(OH)₂ per cent |
|---|---|---|---|---|
| | Retarder | Al₂(SO₄)₃18H₂O | Hydrated lime | |
| 1 | 0.35 | 0.25 | 0.0 | 0.20 |
| 2 | 0.35 | 0.25 | 0.3 | 0.58 |
| 3 | 0.35 | 0.25 | 0.6 | 0.97 |
| 4 | 0.5 | 0.5 | 0.0 | 0.23 |
| 5 | 0.5 | 0.5 | 0.3 | 0.61 |
| 6 | 0.5 | 0.5 | 0.6 | 1.00 |
| 7 | 0.6 | 0.75 | 0.0 | 0.23 |
| 8 | 0.6 | 0.75 | 0.3 | 0.61 |
| 9 | 0.6 | 0.75 | 0.6 | 1.00 |

Of these formulas, Nos. 1, 2, 4, 5, 7, and 8 would give satisfactory performance and no trouble under extreme drying conditions as to surface dry-outs or stiffening prior to commencement of the set, while formulas Nos. 3, 6, and 9, under the same conditions, might be expected to give surface dry-out trouble and rapid stiffening in the mortarbox.

In the formulas in Table II we have assumed the use of retarder and hydrated lime as additives to the plaster, of the same type as hereinabove mentioned in connection with our first description of the invention. If high calcium hydrated lime or Portland cement were employed in compounding the above formulas or if a retarder of lower alkalinity content itself were employed, the maximum permissible amount of added hydrated lime would be increased above the figures shown in the table, bearing in mind, however, the fact that the residual akalinity of the plaster should be kept within a range that is not substantially above 0.7%. The amount of set-stabilizing composition employed is preferably around 2% or less of the weight of the plaster.

Materials other than hydrated lime itself, such for example as are capable of forming calcium hydroxide by hydrolysis or metathesis upon the addition of water, may be substituted therefor in our composition, examples of such products being Portland cement, basic slags, etc. Other well known retarders may be substituted for the commercial retarder recited above, and we may for example avail ourselves, for this purpose, of soluble citrates, acetates, other nitrogenous retarders, etc., while in place of the aluminum sulfate other water-soluble acid-reacting sulfates may be employed, which are of a character which may react with calcium hydroxide to form seed crystals of precipitated calcium sulfate dihydrate when allowed to react with each other in the presence of water. Such water-soluble sulfates include potassium acid sulfate (bisulfate), nickel sulfate, sodium acid sulfate (bisulfate), copper sulfate, ferrous and ferric sulfates, zinc sulfate, magnesium sulfate, etc.

With respect to the desired amounts of set-stabilizing ingredients to be added to our improved plaster, we might say that in general aluminum sulfate or the equivalent acid sulfate may be varied in quantity between 5 and 25 pounds per ton in order to obtain the desired characteristics of the composition. The proportion of retarder will normally be that necessary to produce a plaster of the desired setting time. When employing aluminum sulfate in the amounts above indicated, the variation in retarder will normally be within 6 to 15 pounds per ton. The hydrated lime or other alkaline material capable of forming calcium hydroxide in the presence of water will be varied within the limits defined by added retarder and aluminum sulfate or other sulfate so as to maintain the residual alkalinity of the finished plaster within a range of from just above 0 to not substantially greater than 0.7% when calculated as calcium hydroxide, with a preferred residual alkalinity of 0.5% or below. By this we mean that a lower residual alkalinity is desirable, provided the plaster still reacts alkaline, and the quantity of 0.7% is to be considered substantially as the practical upper limit of permissible residual alkalinity.

We would state in conclusion that while the examples herein recited constitute practical embodiments of the invention, we do not wish to confine ourselves precisely to these details, since manifestly they may be considerably varied without departing from the spirit of the invention, for which we claim:

1. A calcined gypsum plaster characterized by substantial uniformity of setting and browning, comprising a major portion of calcined gypsum and a minor portion of a set-stabilizing composition which latter comprises a retarder, an acid-reacting water-soluble sulfate, and lime, the latter being present in an amount sufficient to insure an alkaline reaction in the plaster when it is mixed with water, said alkalinity however not exceeding substantially 0.7% when calculated as calcium hydroxide.

2. A calcined gypsum plaster characterized by substantial uniformity of setting and browning, comprising a major portion of calcined gypsum and about 2% or less of a set-stabilizing composition which latter comprises retarder, an acid-reacting water-soluble sulfate, and lime, the latter being present in an amount sufficient to insure an alkaline reaction in the plaster when it is mixed with water, said alkalinity however not exceeding substantially 0.7% when calculated as calcium hydroxide.

3. A calcined gypsum plaster characterized by substantial uniformity of setting and browning, comprising a major portion of calcined gypsum and about 2% or less of a set-stabilizing composition which latter comprises retarder, an acid-reacting water-soluble sulfate, and lime, the latter being present in an amount sufficient to insure an alkaline reaction in the plaster when it is mixed with water, said alkalinity being on the order of about 0.5% when calculated as calcium hydroxide.

4. A calcined gypsum plaster characterized by substantial uniformity of setting and browning, comprising a major portion of calcined gypsum and a minor portion of a set-stabilizing composition which latter comprises retarder; an acid-reacting water-soluble sulfate of a metal from the group consisting of potassium, aluminum, nickel, sodium, copper, zinc, iron, and magnesium; and a substance capable of forming calcium hydroxide in contact with water, said substance being present in an amount so proportioned to the said sulfate and retarder as to leave a residual alkalinity in the plaster when mixed with water, said alkalinity not substantially exceeding 0.7% when calculated as calcium hydroxide.

5. A calcined gypsum plaster characterized by substantial uniformity of setting and browning, comprising a major portion of calcined gypsum and a minor portion of a set-stabilizing composition which latter comprises retarder, an alkali metal bisulfate, and a substance capable of forming calcium hydroxide in contact with water, said substance being present in an amount so proportioned to the bisulfate and retarder as to leave a residual alkalinity in the plaster when mixed with water, said alkalinity not substantially exceeding 0.7% when calculated as calcium hydroxide.

6. A calcined gypsum plaster characterized by substantial uniformity of setting and browning, comprising a major portion of calcined gypsum and a minor portion of a set-stabilizing composition which latter comprises retarder, an acid-reacting water-soluble sulfate, and a substance capable of forming calcium hydroxide in contact with water, said substance being present in an amount so proportioned to the said sulfate and retarder as to leave a residual alkalinity in the plaster when mixed with water, said alkalinity not substantially exceeding 0.7% when calculated as calcium hydroxide.

7. A calcined gypsum plaster characterized by substantial uniformity of setting and browning, comprising about 2½% or less of set-stabilizing composition which latter comprises retarder, aluminum sulfate and lime, the latter being so proportioned to the aluminum sulfate and the retarder as to leave a residual alkalinity in the plaster when it is mixed with water of not substantially exceeding 0.7% when calculated as calcium hydroxide.

GEORGE D. KING.
MANVEL C. DAILEY.